Figure 1:
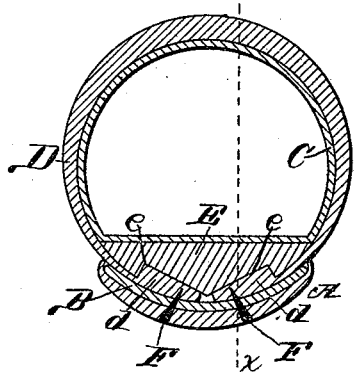

(No Model.) 2 Sheets—Sheet 1.
R. W. HUSS.
PNEUMATIC TIRE FOR VELOCIPEDES.

No. 490,658. Patented Jan. 31, 1893.

Witnesses.
W. D. Middleton
R. M. Wagner

Inventor
Rudolph W. Huss
By Chas. G. Page
Atty.

(No Model.) 2 Sheets—Sheet 2.
R. W. HUSS.
PNEUMATIC TIRE FOR VELOCIPEDES.
No. 490,658. Patented Jan. 31, 1893.
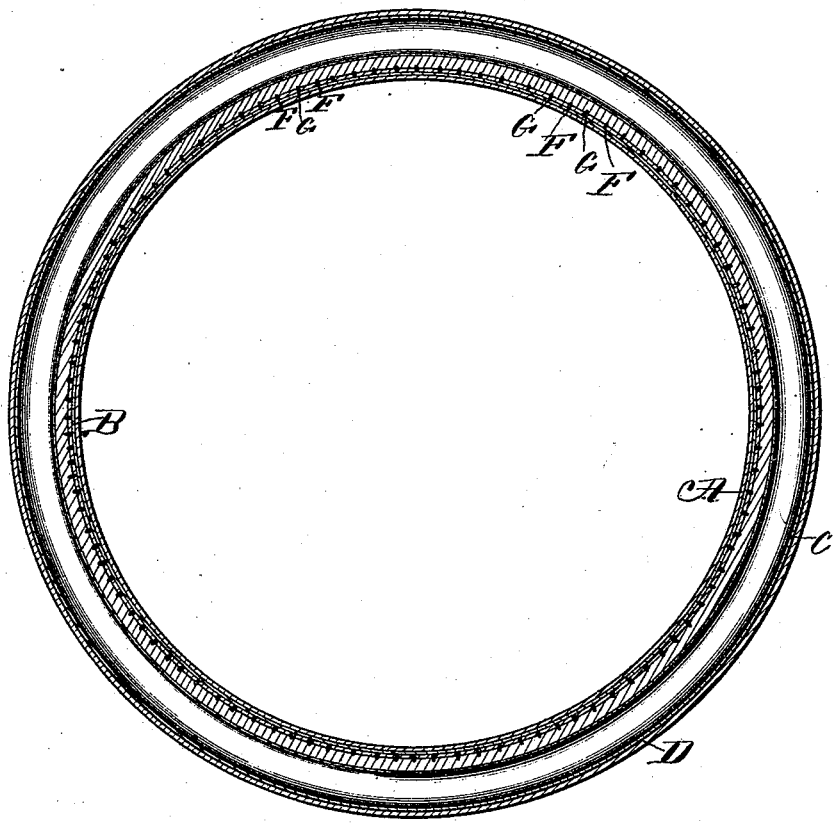
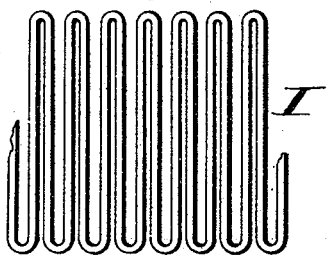
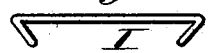
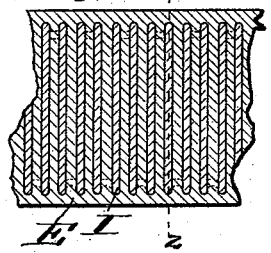
Witnesses.
W. D. Middleton.
R. M. Wagner
Inventor
Rudolph W. Huss
By Chas. G. Page
Atty

UNITED STATES PATENT OFFICE.

RUDOLPH W. HUSS, OF CHICAGO, ILLINOIS, ASSIGNOR TO THE AMERICAN TIRE COMPANY, OF CLEVELAND, OHIO.

PNEUMATIC TIRE FOR VELOCIPEDES.

SPECIFICATION forming part of Letters Patent No. 490,658, dated January 31, 1893.

Application filed March 10, 1892. Serial No. 424,365. (No model.)

*To all whom it may concern:*

Be it known that I, RUDOLPH W. HUSS, a citizen of the United States, residing at Chicago, in the county of Cook and State of Illinois, have invented a certain new and useful Improvement in Pneumatic Tires for Velocipedes, of which the following is a specification.

In a pneumatic tire characterized by my invention, I provide an annular pocket or tube holder consisting of an elastic tube adapted to contain an annular tube or tubular air cushion. The tubular air cushion can be inflated by the use of any suitable means, and is confined within said tube-holder or pocket which provides a covering for the tubular air-cushion. A portion of the space within the tube holder is occupied by an elastic ring or annular band which provides a base support for the tubular air-cushion, being arranged between the latter and the portion of the tube-holder which is held upon the wheel rim, in which way, said annular band or base support intervenes between the annular air cushion and the wheel rim. In order to permit the annular air cushion to be readily introduced within the tube-holder or covering, the latter is split longitudinally along its side portion which comes next to the wheel rim, and by reason of such split or division along the tube-holder the annular band or base can also be readily introduced. The annular band or base also provides a means for securing the edge portions of the tube-holder or tubular air cushion cover along the line of split, and to such end, said edge portions of the tube-holder are adapted to interlock with the annular band. As a further means for securing the edge-portions of the tube-holder, the wheel-rim is provided with spurs or pins which engage in the edge-portions of the tube-holder, and the latter is also provided with spurs or pins which engage in an annular seat upon the wheel rim, the arrangement of the pins being such that the inflation of the air cushion shall tend and serve to force them into the parts they are to penetrate, said pins being also so arranged that any and all disposition of the edge portions of the tube-holder to draw apart, will only serve to render the engagement of the pins more effective. The annular band also provides a base support which prevents the air-cushion from being cut by the wheel-rim when the tire runs over sudden obstructions in the road, and said band is preferably of segmental shape in cross-section so as to leave within the tube-holder an annular space which may be described as being of segmental area or outline in cross-section. This annular, transversely segmental space may be occupied by a tubular air-cushion made of like shape in cross-section, or the air-cushion may in the first instance be made as an ordinary tube, since it will, when inflated within the said tube-holding space, assume a corresponding transversely segmental shape and being thus of ultimate arch form, will be well adapted to withstand the shocks to which a pneumatic tire is subjected during use. As a matter of further improvement, the aforesaid annular band is reinforced against lateral strain, and hence is better adapted to resist strains tending to spread it, while at the same time such reinforcement need not interfere with its elasticity in other directions.

Figure 2:
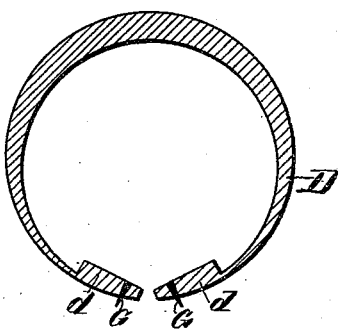
Figure 3:
Figure 4:
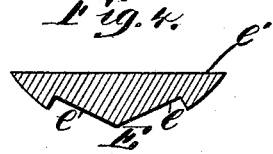
Figure 5:
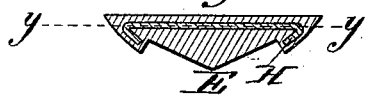
Figure 6:
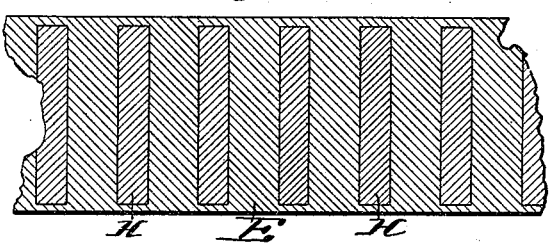

In the accompanying drawings,—Figure 1 represents in cross-section a portion of a wheel rim and pneumatic tire embodying my invention. Fig. 2 is a like view of the cover or holder for the tubular air-cushion, which said device I have hereinafter termed the annular tube-holder. Fig. 3 is a cross-section through a portion of the wheel rim. Fig. 4 is a cross-section through a portion of the ring or annular band which in Fig. 1 is shown confined within the annular tube-holder. Fig. 5 is a cross-section through a portion of the annular band, reinforced by a metal strip. Fig. 6 shows a section taken longitudinally through a portion of said reinforced band, straightened out, the plane of the section being on line $y$—$y$ in Fig. 5. Fig. 7 shows on a reduced scale a section through the wheel rim and tire on a plane indicated by line $x$—$x$ in Fig. 1. Fig. 8 shows a portion of a reinforcing strip made of bent wire. Fig. 9 illustrates an end view of said reinforcing wire strip with its edge portions bent down so as to conform to the band wherein it is to be embedded. Fig. 10 is a longitudinal section through a portion of the elastic band, straightened out, and reinforced by the said wire strip or band. Fig. 11 is a section through the reinforced elastic band on line z—z in Fig. 10.

The wheel rim A is provided with an annular peripherally arranged depression which is made concave in transverse section so as to provide the wheel with the usual annular seat for a tire. To the seat thus provided I apply an annular band B, of rubber, canvas, or other suitable textile material so as to provide a desirable seating surface for the tubular tire structure and also afford a body wherein certain spurs, teeth or pins on the tube holder may engage as hereinafter set forth. The annular tube or tubular air cushion C may be made in the first instance as an ordinary tube which when inflated will assume a cylindric form unless so confined as to be compelled to assume a segmental form in cross-section, or said air cushion may in the first instance be made of segmental shape in cross-section.

The tube-holder or cover D consists of an annular tube of elastic material, and is preferably composed of rubber and canvas or other suitable textile material. Said tube-holder is split longitudinally as illustrated in Fig. 2 and provided along the edge portions of its division with annular catch or locking portions d, d, adapted to engage in corresponding recesses or recess portions e, e in an annular band E. The annular elastic band E is composed of rubber or other suitable composition or material, and is desirably made of segmental shape in cross-section, its annular outer side or perimeter e' being transversely flat, and its inner side being transversely convex with the exception that such convex side is recessed so as to provide it with annular recesses or recess portions e in order to receive the catch portions d of the tube-holder, as illustrated in Fig. 1.

The wheel-rim is provided with pins F projecting from the middle portion of its periphery in annular series and arranged to incline toward the middle line of the rim, and the edge portions of the tube-holder are provided with projecting pins G arranged in annular series and diverging from the line of separation between such edge portions as indicated in Fig. 2.

The foregoing described elements are to be brought together as in Fig. 1, in order to form a pneumatic tire. In bringing such parts together, the seat band B is fitted to the wheel-rim and pierced by the teeth or pins F which are of sufficient length to extend through and project out from said band or seat. The split annular pocket or tube-holder D is also opened so as to receive both the tube C and the annular band E which provides an annular base support for the tube, and the tube-holder is then closed so as to permit its edge-portions d to interlock with said annular base support for the tube C. The tube holder is then applied upon the annular band or seat B, the teeth or pins G of the tube-holder being received within the material which forms said band or seat, while on the other hand, the end portions of the teeth or pins F of the wheel rim are received within the edge portions d of the tube-holder. By inflating the air-cushion C, the edge portions d of the tube-holder will be pressed upon the seat B so as to cause pins G to penetrate the seat, and likewise cause the pins F to penetrate the edge-portions of the tube-holder, and owing to the slant or inclination of the pins G and F, any disposition on the part of the edge-portions of the tube-holder to separate, will cause the pins on the wheel rim to be forced into the edge portions of the tube-holder, and the pins on the edge-portions of the tube-holder to be forced into a seat on the wheel-rim.

In applying the tube-holder to the seat B, the edges of the tube-holder can therefore be first brought together and the air cushion C be then inflated whereby the edge-portions of the tube-holder in slightly separating as a result of the inflation of the air cushion will insure the proper engagement of the pins in the parts they are to hold. The annular base-ring or support E for the air-cushion C, being properly positioned with reference to the diameter of the wheel, also serves to hold the tube-holder down upon seat B, and by reason of its being interlocked with the edge portions b of the tube-holder will effectively hold the same against undue separation. As a matter of further improvement, I reinforce the elastic base ring or band E against lateral stretch, so that while it may be stretched upon the wheel in applying the tire, it will resist any and all tendency on the part of the tube holder to stretch it laterally under the tension due to the inflation of the air cushion.

In Figs. 5 and 6 I have reinforced the base-ring E by embedding therein a series of transversely arranged metal strips H which are desirably molded in said ring. I may however employ other similar means for reinforcing the base ring and to such end, I may for example provide a wire band, I, formed of reversely bent wire as in Fig. 8 and bent down along its edge portions as in Fig. 9, which said wire band can be embedded in the base-ring as illustrated in Figs. 9 and 11.

Where the air-cushion C is originally made as an ordinary tube, it will be so confined between the inner transversely flat side of the base ring E and the inner wall portion of the tube-holder not occupied by such base-ring, that when inflated it will assume a segmental or arch-shape in cross-section, as in Fig. 1.

What I claim as my invention is:—

1. A pneumatic tire comprising an annular tube-holder, an annular tubular air-cushion confined within the annular tube-holder, and an annular band confined within the said tube holder and providing therein a base support for the air-cushion, substantially as described.

2. A pneumatic tire comprising an annular tube-holder, an annular tubular air cushion confined within the annular tube-holder, and an annular band confined within the tube holder and made of segmental shape in cross-section so as to leave within the said tube holder a tube space which is of segmental area in cross-section, substantially as described.

3. In a pneumatic tire, the annular split tube holder, combined with an annular tubular air-cushion, confined within said tube-holder, and an annular band confined within the tube holder between the line of split along the latter and the said air-cushion, substantially as described.

4. In a pneumatic tire, the annular tube holder, combined with an annular tubular air cushion confined within said tube holder, and an annular band E confined within the tube holder and recessed to receive inwardly projecting catch portions with which the tube-holder is provided, substantially as described.

5. The annular tube-holder provided with teeth or pins and containing an annular tubular air-cushion, combined with a wheel-tire provided with a seat for the tube holder, the teeth or pins of the tube-holder being arranged to engage in said seat, substantially as described.

6. The annular tube holder, containing a tubular air-cushion, in combination with a wheel rim supporting the annular tube holder and provided with teeth or pins F projecting from the middle portion of the periphery of the rim in two annular series and arranged to incline toward the middle line of the rim and engage the tube holder, substantially as described.

7. The combination of the annular split tube-holder containing a tubular air-cushion, and provided with teeth or pins and the wheel rim provided with an annular seat and with pins projecting from said seat, the pins of the tube-holder being arranged to engage in the seat, and the pins on the wheel-tire being arranged to engage in the tube-holder, substantially as described.

8. In a pneumatic tire, the annular split tube holder containing a tubular air-cushion, in combination with the annular band confined within and holding the edge-portions of the split tube-holder and reinforced so as to prevent lateral stretch, substantially as described.

9. The combination of the annular, split tube holder, the tubular air-cushion confined within the annular tube-holder, the annular band E confined within the annular tube holder and interlocking with the edge-portions thereof, the seating band B on the wheel-tire, the wheel tire provided with pins F, and pins G on the tube-holder, substantially as and for the purpose described.

10. The combination of an annular split tube-holder containing the air-cushion and provided with projecting teeth or pins along its edge portions, and a wheel-tire provided with a peripheral seat for the tube-holder, the pins of said tube-holder being forced into the seat on the wheel-rim, substantially as described.

11. The combination of an annular split tube-holder containing the air cushion, and the wheel rim provided with teeth or pins F projecting from the middle portion of the periphery of the rim in two annular series and arranged to incline toward the middle line of the rim and engage in the edge portions of said tube-holder, substantially as described.

RUDOLPH W. HUSS.

Witnesses:
W. D. MIDDLETON,
CHAS. G. PAGE.